United States Patent [19]

Meszaros

[11] Patent Number: 4,752,706
[45] Date of Patent: Jun. 21, 1988

[54] ROLLING MAGNETIC FRICTION ELECTRICITY GENERATOR

[76] Inventor: Leslie G. Meszaros, 404 Conrad Pelletier, LaPrairie, Quebec, Canada, J4R 3E5

[21] Appl. No.: 845,183

[22] Filed: Mar. 28, 1986

Related U.S. Application Data

[63] Continuation-in-part of Ser. No. 651,844, Sep. 18, 1984, abandoned.

[30] Foreign Application Priority Data

Sep. 22, 1983 [CA] Canada .................................. 437353

[51] Int. Cl.⁴ .............................................. H02K 7/06
[52] U.S. Cl. ...................................... 310/80; 310/82; 310/83
[58] Field of Search ................... 310/80, 82, 83, 115, 310/118

[56] References Cited

U.S. PATENT DOCUMENTS

| 2,703,370 | 3/1955 | Steensen | 310/82 |
| 3,168,665 | 2/1965 | Holper | 310/118 X |
| 3,322,984 | 5/1967 | Anderson | 310/82 |

FOREIGN PATENT DOCUMENTS

11421 of 1896 United Kingdom .................. 310/82

*Primary Examiner*—Donovan F. Duggan
*Attorney, Agent, or Firm*—Charles E. Brown; Charles A. Brown

[57] ABSTRACT

In accordance with the invention the magnetic friction force is overcome by a rolling motion whereby there is physical contact between the field magnets and the core. As experiments show, reversal of magnetic flux polarity on and in a ferromagnetic object was 14 times less difficult to realize by such rolling motion. Because full contact is realized between field magnets and winding cores, a greater flux density is produced by the magnetic circuit. The above concept introduces a whole new breed of distinctly different rolling motion electricity generators.

7 Claims, 3 Drawing Sheets

ROLLING MAGNETIC FRICTION ELECTRICITY GENERATOR

CROSS-REFERENCE TO RELATED APPLICATION

This is a C-I-P of parent application Ser. No. 651,844, filed Sept. 18, 1984, now abandoned.

BACKGROUND OF THE INVENTION

1. Field of the Invention:

The invention relates to an apparatus for generating of electricity. More specifically, the invention relates to such an apparatus which includes a magnetic element and a coil element, wherein, by relative rolling motion between the outer surfaces of the magnetic element and the coil element, there is produced a magnetic field of alternating direction, whereby to produce electricity.

2. Description of the Prior Art:

In the presently used dynamos and electricity generators all the resistance to rotation causes losses which reduces efficiency. The resistance of the magnetic fields to mechanical motions (rotations) of ferromagnetic cores or magnetic fields is comparable to an extent to the resistance (friction force) of an object when mass pulled along a plain surface.

rotor as large losses are experienced by a magnetic field as it passes through an air gap. Accordingly, the size of the air gap between the stator and rotor must be held as small as possible in order to avoid undue losses.

SUMMARY OF THE INVENTION

I have found that with my novel electricity generators this energy consuming magnetic resistance force can be reduced considerably by using a rolling motion, which is comparable to a cylindrical mass being rolled instead of being pulled on a plain surface.

Also the object of the invention to provide such an apparatus which eliminates magnetic field losses due to passage of the magnetic field through an air gap.

The idea is applicable to generators with electro magnetic or permanent magnetic systems and can produce electricity of direct current or alternating current and can be small or large in size.

BRIEF DESCRIPTION OF THE DRAWINGS

The invention will be better understood by an examination of the following description together with the accompanying drawings, in which.

DESCRIPTION OF PREFERRED EMBODIMENTS

Figure 1:
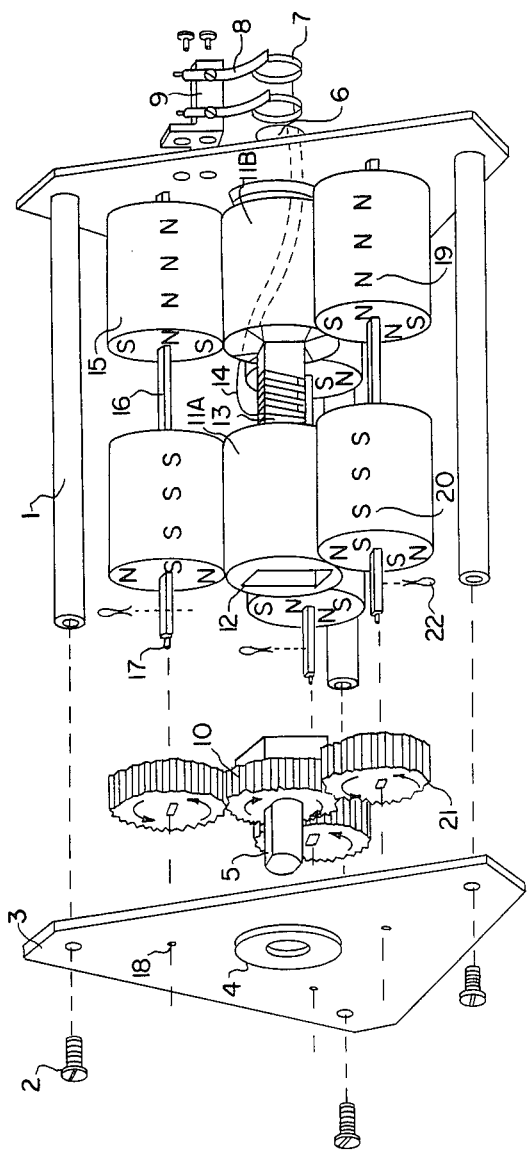
FIG. 1 is an exploded perspective view of an apparatus including a tubular core and a cylindrical permanent magnetic system.

The rolling motion electricity generator of FIG. 1 has a frame container with three rods (1) of equal length which firmly hold together, with screws (2), two side plates (3). Mounted centrally of the side plates (3) are ballbearing beddings (4). Input shaft (5) extends through the ball bearing bedding of one side plate and output shaft (6), which is hollow to allow winding wire ends to be led therethrough to the copper slip rings (7) of the commutator which are also mounted on the output shaft, and naturally insulated from short-circuiting extends through the ball bearing bedding of the other side plate. The collectors (8) of slip rings (7) are mounted on collector base (9) which is mounted on the side plate above the slip rings in such a way that each collector contacts the ring directly under it (the collectors should be also short-circuit-proofed). On the input shaft (5) a main gear (10) is mounted, and the inner end of the shaft (5) is adapted to be firmly inserted in the iron core (11A) such that when the inner end of the output shaft (6) is firmly inserted on the other side of the core (11B), together they form a firm main shaft (5), (6), (11A), (11B), with portion (13) (see below). The iron cores (11A) and (11B) are formed from a single hollow cylinder with shaft connections (12) on the outer ends thereof. The cylinder is squeezed in at the center to form portion (13) on which the usual insulated copper wire (14) is wound in a usual manner and conducted out to the slip rings (7), is fitted into the other ends of cylinders (11A) and (11B). Three pairs of cylindrical magnets (15) are mounted on three square magnet holding rods (16) which have cylindrical ends (17) to be inserted in respective ones of holes (18) in the side plates so as to permit rotational motion of the rods (16). All three pairs of the cylindrical magnets are parallel to each other and to the main shaft. The cylindrical magnets are available dynamo magnets each having two North (19) and two South (20) poles. Each cylinder of a pair is mounted firmly on its respective magnet holding rod spaced apart from the other cylinder on the same rod such that each cylinder touches the iron core with opposite polarity. When the three pairs of magnets around and in contact with the iron core then one end of the tube (11) is of one polarity while the other is of the opposite polarity when the contact surfaces are at maximum flux strength density. Therefore, a magnetic circuit is created through the center of the iron core and the windings. To the main gear are connected three phase control gears (21) mounted on the magnet holding rods secured by holding pins (22). The interconnections of the gears prevent out of phase slippings. All materials used with the exception of the iron core and the magnets should not be ferromagnetic. Laminating of the core should be in the usual way if needed. When the main shaft is rotated a full rolling, magnetic varying, contact is maintained, therefore only rolling motion is used for maintaining a continuous rate of change of polarity and thereby generating electricity.

The above description is for a single unit. There are many ways of coupling additional units for greater output. There are also possibilities for more and different magnets to be used for better results in the same functioning context, for example, a combination of "U" shaped magnets forming a cylindrical magnet of multiple polarities would allow a fully closed magnetic circuit.

In operation, for each pair of cylinders, a magnetic circuit is created from one cylinder through the iron core adjacent to that cylinder, through the windings 14, through the other iron core, to the second cylinder. Thus, in FIG. 1, a magnetic circuit is created from the North pole of 20 through the iron core 11a, through the portion 13, through the windings 14, through the iron core 11b, to the South pole of the cylinder 19. Similar magnetic circuits are created through the other pairs of cylinders.

When the cylinders are rotated through an angle of 90° (as will be seen below, the rotation of the cylinders is synchronized so that all of the cylinders will rotate through the same angle at the same time) then a magnetic circuit of opposite direction is created. Thus, by rotating the cylinders, as discussed below, a magnetic field of alternating direction is created through the coil element.

Figure 2:
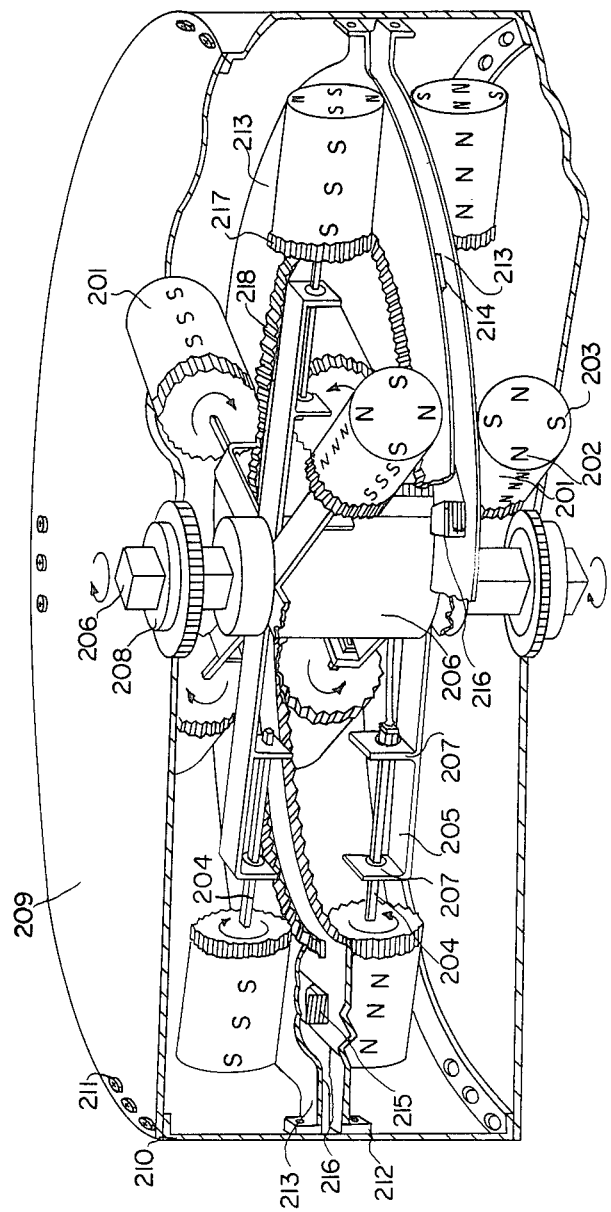
FIG. 2 a perspective view with parts broken away of an apparatus which includes a plain surface circular core and a cylindrical permanent magnetic system.

The rolling motion electricity generator of FIG. 2 has twelve cylindrical magnets (201) of two North (202) and two South (203) polarities each (as in FIG. 1). They are mounted individually with their axles (204) on branches (205) of main shaft (206) such that they can rotate in the ballbearing holders (207) of the branches. The branches are spaced at equal angular intervals in two levels on the main shaft, which itself can rotate in the ballbearing center (208) of the end pieces (209) which are held apart from each other by the side pieces (210) secured firmly with screws (211). To the center of the side pieces is mounted with screws (212) the iron core (213) which is shaped like a pair of large size washers or O-shaped plates parallel to each other and to the end pieces. The two washer-like parts are attached together by evenly spaced square iron tubes (214) which are disposed centrally between the washer-like parts. The square tubes are the mandrels for the usual copper wire windings (215). The core is placed between the two levels of magnets in close contact with the magnets. Therefore, when the main shaft is rotated the magnets are rolling on the flat surfaces of the core. Thus, once again, it is rolling motion by which electricity is generated. The upper level of magnets are in contact with the upper washer with one polarity while at the same time the lower level of magnets in contact with the lower washer with the opposite polarity. Since the side pieces are non-ferromagnetic a magnetic circuit is realized across the square tubes at the center of the windings. As the magnets are rolling on the core a change of polarity is maintained through the windings and electricity appears between the ends (216) of the wire windings. Out of polarity slipping of the individual magnets is prevented by the gears (217) mounted on the ends of the magnets. The gears (217) mesh with the toothed inner part (218) of the core. Since rolling is in a circular plane slightly cone shaped magnets should be used and the core should be shaped to that effect.

Variations in the FIG. 2 embodiment include an increase in the number of magnets or a rotating core between the magnets while still using the same rolling motion concept. Ferromagnetic materials should be used only where it is necessary.

Figure 3:
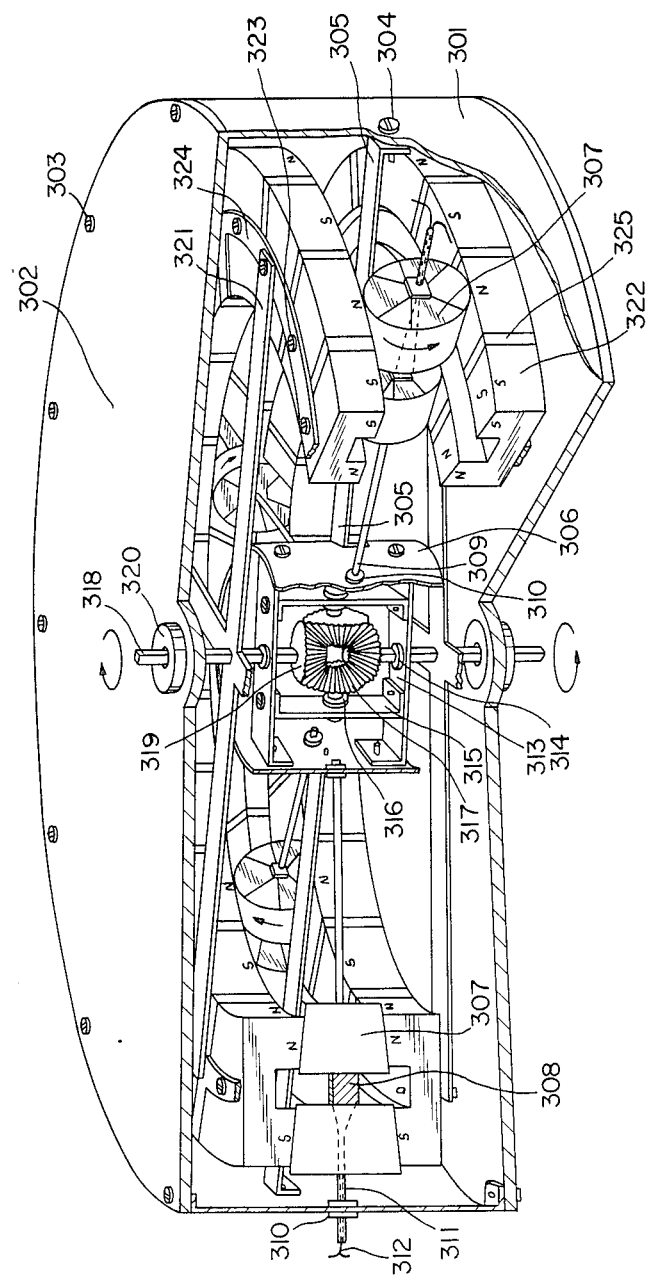
FIG. 3 is a perspective view of parts broken away of an apparatus with a multi-tubular core and a plain surface permanent magnetic system.

The rolling motion electricity generator of FIG. 3 has a double cylindrical, tubular frame consisting of an outer frame (301) and an inner frame (306). The outer frame (301) is closed at its ends by the end pieces (302) secured by screws (303). At the inside center of the wall of the outer frame, frame holders (305) are secured with screws (304). The frame holders are also secured to the outside center of the wall of the inner frame (306), which is shorter and considerably smaller in diameter than the outer frame, by screws. Between the frame holders (305), in a similar spoked fashion, are the copper wire (insulated the usual way) winding cores (307) which are truncated conical tubes with the center of the tubes shaped as narrow square tubes to form the mandrels for the windings (308). Only the cores should be made of iron or ferromagnetic material. Each core is rotatable with shafts (309) whose ends extend through ballbearing beddings (310) in the walls of the inner and outer frames. The portions of shafts (311) leading to the outer frame are hollow to permit the winding wire ends (312) to extend through them to commutators not shown in this drawing. At the inside wall of the inner frame, close to the top and bottom thereof, are mounted with screws, and parallel to each other and to the end pieces, input shaft holders (313) which have ballbearing beddings (314) at their center. Mounted transversely to and between the input shaft holders (313) with screws are transfer gear holders (315) which are parallel to each other and to the walls of the frame. Ballbearing beddings (316) are disposed centrally of the holders (315) and transfer gears (317) extend through the beddings (316). The conic gears, which have faces at 45° angles to their center of rotation, face each other without contact. Each individual input shaft (318) has a similar gear (319) mounted at their inner extremities. Gears (319) contact the transfer gears (317) but not each other. Gears (319) are rotated in an opposite direction to each other through the gear train. The magnet holding wheels (321) are firmly mounted on the input shafts between the end pieces and the inner frame. The magnets (322) are "U" shaped with allowances to accommodate the cone shape of the winding cores. They are mounted with screws (323) through their centers to the outer perimeter (324) of the wheels, with non-ferromagnetic spacers (325) between each magnet. The magnets are mounted to define an inner ring and an outer ring, the polarities of the rings being opposed, the poles of the magnets facing the winding cores. The magnets are placed in a sequence of changed polarities to each other in a circular fashion on both wheels and the winding cores are disposed between the poles such that one end of the core is of one polarity at the same time that the opposite end is of the opposite polarity and similarly on all the cores. When any of the input shafts are rotated the magnet holding wheel mounted on it rotates with it while due to the effect of the gears the second magnet holding wheel rotates in the opposite direction. Thus, the cores are rolling between the magnetic surfaces (which should be smooth) and polarity is constantly changing through the windings so that electricity is produced. The magnetic attraction opposing the motion is reduced by the rolling motion. All materials used should be the same as in prior art electricity generators. Materials for the cores should be made for best hysteresis and permeability results.

To each and all three rolling motion electricity generators there is applied an input of continual mechanical energy from any outside source in the form of rotation to the outer extremities of the input shaft of FIG. 1, mainshaft on FIG. 2 and input on FIG. 3.

The advantages of the rolling motion electricity generator result from the fact that both magnetic poles attract ferromagnetic materials and therefore transferring one pole to the other on a ferromagnetic surface is similar to a transfer of weight from point A to point B at the same height.

The efficiency ratio in percentages to convert mechanical energy to electricity with a rolling motion electricity generator is not defined and could be different with each type of rolling motion electricity generator since the diminution of magnetic force opposing the mechanical motions is not limited at a ratio of 14 to 1, in a way as diminution of kinetic or static friction by rolling friction is dependent on many factors.

Although particular embodiments have been described, this was for the purpose of illustrating, but not limiting the invention. Various modifications, which come readily to the mind of one skilled in the art, are within the scope of the invention as defined in the appended claims.

I claim:

1. A generator for producing electricity by rolling motion, comprising:
   a. magnetic means to produce at least two magnetic poles, said magnetic means comprising a set of at least two like, spaced structures, each of said structures having an outer surface, and means for fixedly connecting said structures relative to each other;
   b. at least one winding core means having a set of at least two like, spaced structures comprising a conductive material, each of said structures having an outer surface, a mandrel disposed between said structures to fixedly connect said structures relative to each other, said mandrel having a plurality of coil turns wound thereon;
   c. container means for maintaining the outer surface of one of said structures of said magnetic means in physical contact with the outer surface of one of said structures of said winding core means, and the outer surface of the other one of said structures of said magnetic means in physical contact with the outer surface of the other one of said structures of said winding core means such that the outer surfaces of one of said sets is rollable on the outer surfaces of the other one of said sets;
   whereby, to define a magnetic circuit from said one of said structures of said magnetic means, through said one of said structures of said winding core means, through said plurality of coil turns, through said other one of said structures of said winding core means, through said other one of said structures of said magnetic means, and back to said one of said structures of said magnetic means;
   whereupon, to produce electricity in said plurality of coil turns on the application of mechanical energy to cause rolling motion of the external surfaces of said one of said sets on the external surfaces of the other one of said sets to thereby produce a continuous reversal of magnetic flux direction in said winding core means.

2. An apparatus as defined in claim 1 wherein said set of structures of said magnetic means comprises an arrangement comprising at least one pair of cylindrical magnets of multiple polarities on the external rollable surfaces of said cylindrical magnets, said means for fixing comprising a common axle, said cylindrical magnets being mounted at opposite ends of said common axle such that polarities of either one of said cylindrical magnets are aligned with opposite polarities of the other one of said magnets;
   said set of structures of said winding core means comprising a pair of cylinders mounted at opposite ends of said mandrel to form a rollable core and disposed such that the cylinders are in physical contact with respective ones of the cylindrical magnets and the winding cores adjacent the space between said cylindrical magnets;
   whereby the surfaces of said cylindrical magnets are rollable along the surfaces of said cylinders.

3. An apparatus as defined in claim 2 wherein said magnetic means comprises three arrangements;
   said arrangements being spaced at equal angular intervals around said pair of cylinders.

4. An apparatus as defined in claim 3 and further including gear means mounted at a common end of each of the axles of said three arrangements;
   shaft means connectable at one end thereof to mechanical means for rotating said shaft means and connected at the other end thereof to said pair of cylinders such that, when said shaft means is rotated, said pair of cylinders will rotate with said shaft means;
   a gear member, meshing with said gear means mounted on said shaft means, whereby, when said shaft means is rotated, said gear member rotates thereby causing said gear means and, thereby, said arrangements, to rotate such that said cylindrical magnets roll along the surfaces of said pair of cylinders; and
   wire ends extending from said coil to a slip ring arrangement;
   whereby to collect electricity generated by said generator.

5. An apparatus as defined in claim 1 wherein:
   1 said set of structures of said winding core means comprises:
      a. a pair of O-shaped plates disposed in concentric, spaced arrangement parallel to each other;
      b. a plurality of winding mandrels disposed in the spaces between said plates at equal angular intervals;
   2 said set of structures of said magnetic means comprises:
      a. a first plurality of magnets, in the shape of truncated cones, mounted for rolling contact on the top surface of the top plate at equal angular intervals therearound;
      b. a second plurality of magnets, in the shape of truncated cones, mounted for rolling contact on the bottom surface of the bottom plate at equal angular intervals therearound;
      c. said first plurality being equal to said second plurality;
      d. respective ones of the magnets of the first plurality being disposed adjacent respective ones of the magnets of the second plurality such that facing surfaces of the respective cylindrical magnets are of opposite polarities;
   3 an input shaft for receiving rotary motion;
   4 means for transferring said input rotary motion to said magnetic means; and
   5 meshing gears to control out of phase slippage between said input shaft and said transmission means.

6. An apparatus as defined in claim 5 wherein said input shaft extends centrally through said pair of O-shaped plates;
   a plurality of arms extending transversely of said input shaft and being spaced at equal angular intervals therearound, said first plurality of arms being equal to said first plurality of magnets, a separate one of said first plurality of arms being associated with a separate one of said first plurality of magnets, and means for connecting each magnet of said first plurality of magnets to its associated arm such that the cylindrical magnets are rotatable relative to their associated arms;

a second plurality of arms extending transversely of said input shaft and being spaced at equal angular intervals therearound, said second plurality of arms being equal to said second plurality of magnets, a separate one of said second plurality of arms being associated with a separate one of said second plurality of magnets, and means for connecting each magnet of said second plurality of magnets to its associated arm of said second plurality such that the magnets are rotatable relative to their associated arms;

whereby, when said input shaft is rotated, said arms and magnets are rotated such that said first plurality of magnets will roll along the top surface of the top O-shaped plate and the second plurality of magnets will roll along the bottom surface or the bottom O-shaped plate.

7. An apparatus as defined in claim 1 wherein:

1 said set of structures of said magnetic means comprises:
 a. a first magnetic ring consisting of a first plurality of equal sized magnets which are U-shaped in cross-section, each leg of each U being of opposite polarity to the other leg of the same U, like portions of the magnets being of opposite polarity to like portions of abutting magnets;
 b. a second magnetic ring consisting of a second plurality of equal sized magnets which are U-shaped in cross-section, each leg of each U being of opposite polarity to the other leg of the same U, like portions of the magnets being of opposite polarity to like portions of abutting magnets;
 c. said first magnetic ring being disposed in spaced parallel relationship with said second magnetic ring such that the legs of the first magnetic ring face the legs of the second magnetic ring, adjacent legs of each ring being of the same polarity;
 e. non-ferromagnetic spacers being disposed, between each of the magnets;

2 said set of structures of winding core means comprises:
 a. a plurality of rolling elements spaced at equal angular intervals between said rings, each element being in the shape of a truncated cone and comprising:
  i. a first rolling surface for rolling along the surfaces of the inner legs of the two rings;
  ii. a second, spaced, rolling surface for rolling along the surfaces of the outer legs of the two rings;
  iii. means supporting a winding core between said first and second rolling surfaces.

* * * * *